March 19, 1974 J. SKOK 3,798,125
NUCLEAR FUEL SUBASSEMBLY
Filed Nov. 16, 1971 3 Sheets-Sheet 1
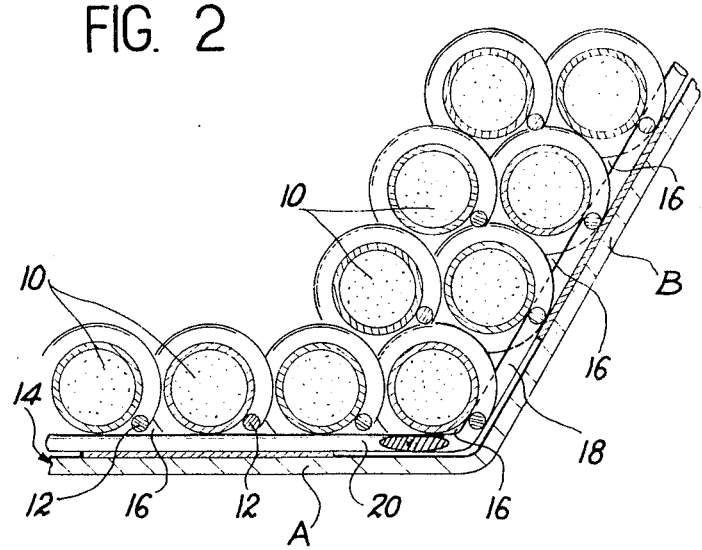
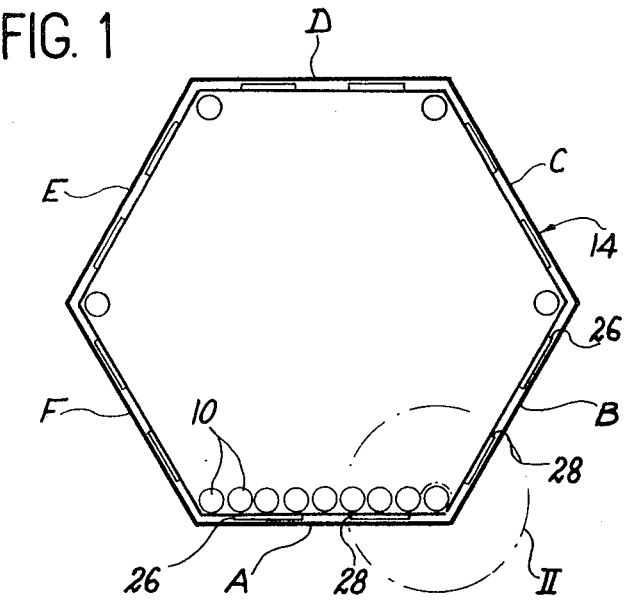

United States Patent Office 3,798,125
Patented Mar. 19, 1974

3,798,125
NUCLEAR FUEL SUBASSEMBLY
Jean Skok, Aix-en-Provence, France, assignor to
Commissariat a l'Energie Atomique, Paris, France
Filed Nov. 16, 1971, Ser. No. 199,104
Claims priority, application France, Nov. 20, 1970,
7041794
Int. Cl. G21c *3/08, 3/32*
U.S. Cl. 176—78    5 Claims

ABSTRACT OF THE DISCLOSURE

A nuclear fuel assembly for a liquid metal cooled fast reactor comprises a bundle of fuel pins in a shroud. Each pin carries a helical spacer fixing the minimum spacing between each pin and the adjacent pins or the shroud. Localized head losses along the lateral subchannels are produced by wires disposed parallel to the inner wall of the shroud and obliquely with respect to the axes of the pins.

BACKGROUND OF THE INVENTION

The invention relates to a nuclear fuel subassembly of the kind comprising at least one bundle of elongated pins of canned fuel, the pins being disposed in a regular lattice and the bundle being surrounded by a shroud through which a coolant flows. The pins are in most cases parallel to each other, although the bundle may also be slightly convergent. The minimum spacing between the pins in each bundle is determined by spacer members spirally wound on the pins. Subassemblies of the aforementioned kind can comprise a bundle of pins disposed in a triangular lattice in a shroud of hexagonal cross-section; the aforementioned feature is currently used in subassemblies for liquid-metal cooled fast neutron reactors.

In fuel subassemblies of the aforementioned kind used in conventional reactors, the projection of the spacer members is the same for each pin and is identical, also for each pin, at all places on the spacer member. The aforementioned feature has a serious disadvantage in that the flow rates through each of the subchannels bounded by pins or by the shroud are not proportional to the heating surfaces (the fuel pin surface) bounding the subchannels. More precisely, the ratios between the flow rate through a lateral subchannel and the flow rate through an inner subchannel is excessive, producing a temperature imbalance which adversely affects the yield.

In the nuclear fuel subassembly, disclosed and claimed in patent application Ser. No. 96,782 assigned to the assignee of the present invention, the spacer members carried by the lateral pins in the bundle have a radial projection (with respect to the pin) which is smaller in the regions where the spacer members bear against the shrouds, thus reducing the imbalances. In this manner, the flow rates in the subchannels are balanced, more particularly if the aforementioned feature is used in combination with a shroud having suitable longitudinal bosses on its inner wall—or rather the flow rates are balanced if the localized head losses are disregarded. The head losses are mainly due to periodic constrictions produced by the movement of the spacer members into the subchannels. The aforementioned individual head losses are more numerous on inner subchannels than on lateral subchannels where there is only one spacer member instead of three for the inner subchannels.

The invention aims to provide a nuclear fuel subassembly wherein the aforementioned imbalance between the lateral and inner channels is reduced; to this end, the lateral subchannels are provided with localized head loss means, regularly distributed along the subchannels.

In a particular advantageous embodiment of the invention, the means for producing head losses are made up of wires disposed helically on the inner wall of the shroud and having an axial inclination such that they do not interfere with the spacer members. Advantageously, the wires have a projection equal to that of the spacer members bearing on the shroud, and thus provide additional support for the lateral pins. Of course, the number of wires is chosen so as to provide a suitable head loss.

The head loss means according to the invention are advantageously used in combination with the spacer members having a variable projection disclosed in the aforementioned patent application. They may, however, also be used independently.

BRIEF DESCRIPTION OF THE DRAWINGS

The invention will be more clearly understood from the following description of an exemplary, non-limitative embodiment of a fuel subassembly according to the invention. The description refers to the accompanying drawings, in which:

FIG. 1 is a diagrammatic cross-section of the subassembly, only one layer of pins being shown for simplicity;

FIG. 2 shows a detail on a larger scale of the region indicated by II on the FIG. 1, at the level of line II—II in FIG. 3;

DESCRIPTION OF THE PREFERRED EMBODIMENT

Figure 3:
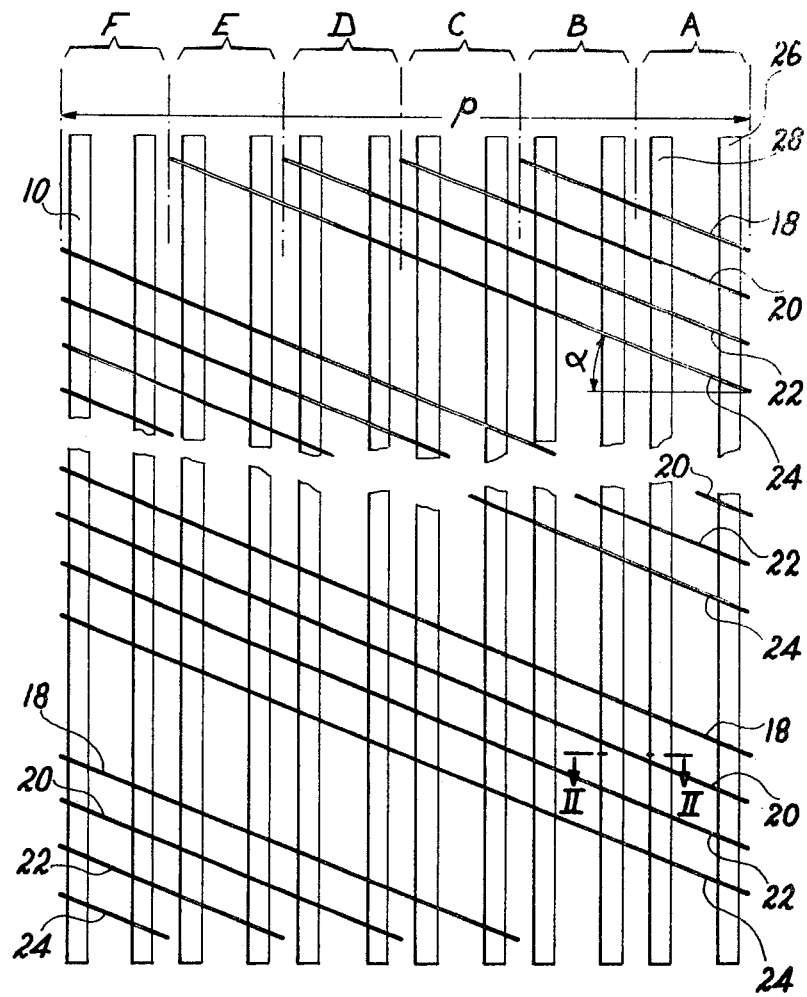
FIG. 3 is an expanded view of the assembly of wires forming means for producing distributed head losses, and of the strips bearing them.
Figure 4:
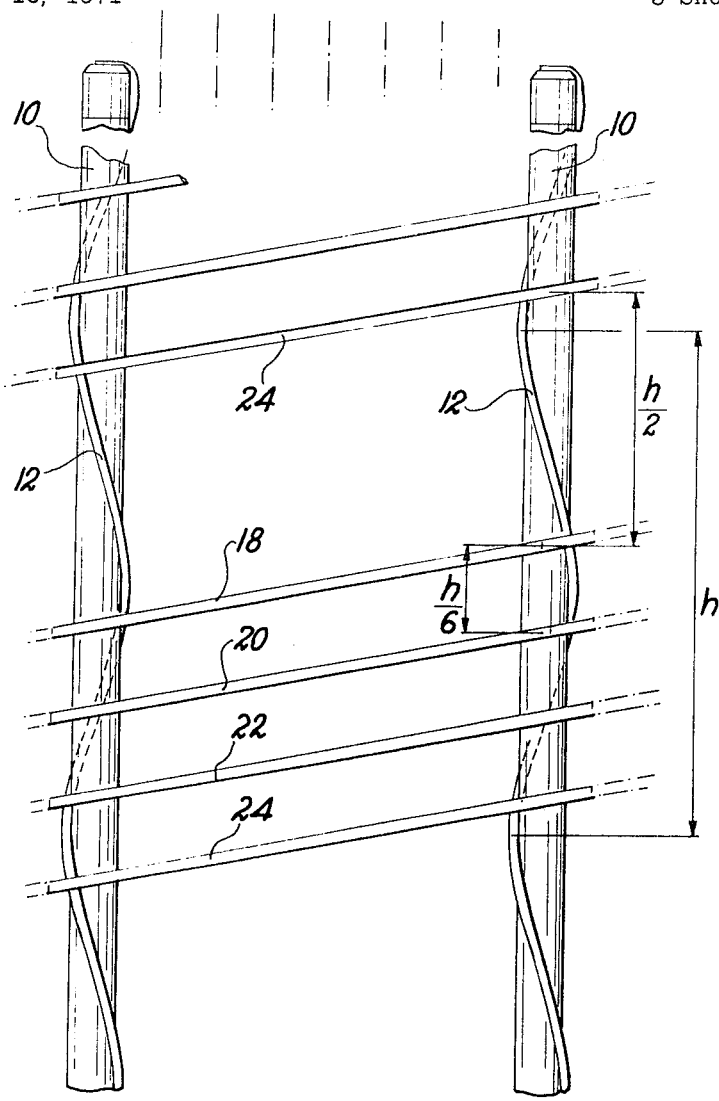
FIG. 4 diagrammatically shows how the wires in FIG. 3 bear on a layer of lateral pins (only the corner pins are shown, the axes of the other pins merely being indicated by chain-dotted lines).

The nuclear fuel subassembly shown in diagrammatic cross-section in FIGS. 1 and 2 is of mainly conventional construction. It comprises a bundle of canned nuclear fuel pins 10 disposed in a regular triangular lattice (for simplicity, only the corner pins and a lateral layer of pins are shown in FIG. 1). Pins 10 are borne by a grid (not shown in the drawings) secured to a shroud 14 of hexagonal cross-section bounding a duct through which a coolant (such as molten sodium) flows. The spacing between the pins is fixed by a spacer device comprising a spacer member 12 disposed on each pin 10, helically wound on the fuel pin can and bearing on the cans of adjacent pins or on the wall of the shroud. The spacer members may be made up of metal wires 12 having a constant diameter along their entire length and the same diameter on all the pins, as shown in FIG. 2. The wires can also have variable projections, according to one of the features described and claimed in the aforementioned patent application.

The fuel subassembly according to the invention comprises means for producing localized head losses and distributed along each of the lateral subchannels 16, the subchannels being bounded partly by one or more pins and partly by shroud 14. The means for producing localized pressure drops comprise wires helically wound round the bundle and distributed and placed at an inclination such that they do not interfere with the spacer wires 12, the number of helical wires being chosen so as to provide a suitable head loss. In the case illustrated in the drawings, four helical wires 18, 20, 22 and 24 are spaced at intervals of $h/6$, $h$ being the axial winding pitch of the spacer wires 12 on the pins. The angle of inclination $\alpha$ of the wires forming the head loss means is advantageously such that the axial winding pitches are the same for the spacer members and for the wires producing the head loss; we then have:

$$\alpha = \text{arc tan } (h/p)$$

In the aforementioned formula, $p$ denotes the perimeter of the hexagon circumscribed round the bundle of pins. At the aforementioned value of $\alpha$, there is no interference irrespective of the number of turns in the wires, provided that they do not interfere with the spacer members over a complete turn. If there are four wires at a spacing of $h/6$ there is a space of $h/2$ between adjacent wires in the region through which the spacer wire 12 extends.

In the embodiment illustrated in the drawings, wires 18, 20, 22 and 24 are spaced and disposed in suitable manner by longitudinal strips, two strips 26, 28 being provided on each face A, B, C, D, E and F of shroud 14 (the corners of which are shown diagrammatically in chain-dotted lines in FIG. 3). Strips 26, 28 are e.g. of stainless steel of the same grade as the shroud. In the aforementioned assembly, wires 18, 20, 22 and 24 advantageously have the same diameter as the spacer wires 12 in the bearing region thereof. This has the additional advantage of increasing the number of supports of the lateral pins.

Accordingly, the structure shown in expanded form in FIG. 3 can be constructed before assembly by welding the wire portions 18, 20, 22 and 24 on strips 26, 28. Next, the wires are bent along the chain-dotted lines to form a structure of hexagonal cross-section. The ends of the wire portions are welded so as to connect the portions numbered 18, 20, 22 and 24 respectively in FIG. 3. According to another embodiment (not shown) the two end strips in the expanded structure shown in FIG. 3 are made wider than the others so that they can be welded end to end. The hexagonal structure can then be secured to the bundle of pins, e.g. by welding the ends of the steel strips 26, 28 to the bottom and top plugs of pins 10. The assembly is then placed inside the hexagonal shroud.

For example, a structure having the following features can be used in a fuel subassembly whose shroud has inner plates at 117 mm. intervals and contains 6.6 mm. pins provided with a spacer wire 1.1 mm. in diameter. Four wires borne on stainless steel strips 0.15 mm. thick and 20–25 mm. wide are provided at intervals equal to one-sixth of the winding pitch of the spacer wires, the four wires being of the same diameter as the spacer wires.

What I claim is:

1. A nuclear fuel subassembly comprising at least one bundle of substantially parallel fuel pins disposed in a regular lattice in a coolant guiding shroud, each pin carrying on at least the major part of its length, a helical spacer member fixing the minimum spacing between each pin and the adjacent pins or the shroud, and including means separate from the helical spacer members for producing localized head losses, regularly distributed along lateral subchannels bounded by the shroud and the lateral pins in the bundle out of contact with the helical spacer members, said separate means being wires disposed parallel to the inner wall of the shroud and obliquely with respect to the axes of the pins and helically wound on and around the exterior of the bundle of fuel pins at a substantially uniform pitch in the same direction as the spacer members, the spacer members being wires each wound helically on and secured to one pin having a diameter equal to that of the wires of said separate means where the wires of said separate means bear on the shroud.

2. A subassembly according to the claim 1, wherein the winding pitch of the helical wires for producing head losses on the shroud has an axial length equal to that of the winding pitch of the spacer wires on the pins.

3. A subassembly according to claim 1, wherein the wires of said separate means are connected to thin strips parallel to the pin axes and bearing on the shroud.

4. A subassembly according to the claim 3, wherein the strips are secured to end plugs carried by the lateral pins of the bundle.

5. A subassembly according to claim 1, the shroud having a hexagonal cross-section and the pins being disposed in a regular triangular lattice, the wires of said separate means being carried by longitudinal strips disposed on each side of the shroud.

References Cited

UNITED STATES PATENTS

| | | | |
|---|---|---|---|
| 3,281,325 | 10/1966 | Hennig | 176—81 X |
| 3,310,474 | 3/1967 | Saunders | 176—78 X |
| 3,318,778 | 5/1967 | Morita | 176—78 X |
| 3,352,758 | 11/1967 | Anthony | 176—78 |
| 3,677,893 | 7/1972 | Huebotter et al. | 176—78 |

FOREIGN PATENTS

| | | | |
|---|---|---|---|
| 850,021 | 9/1960 | Great Britain | 176—76 |

CARL D. QUARFORTH, Primary Examiner

E. E. LEHMANN, Assistant Examiner

U.S. Cl. X.R.

176—81